United States Patent
Duursma et al.

(10) Patent No.: US 6,643,690 B2
(45) Date of Patent: *Nov. 4, 2003

(54) APPARATUS AND METHOD FOR DETERMINING A PROGRAM NEIGHBORHOOD FOR A CLIENT NODE IN A CLIENT-SERVER NETWORK

(75) Inventors: Martin Duursma, West Pennant Hills (AU); Anatoliy Panasyuk, West Ryde (AU); Anthony Ungerman, Boca Raton, FL (US); Bradley Jay Pedersen, Parkland, FL (US); Tom C. Davis, III, Coral Springs, FL (US); Marc A. Bloomfield, Lighthouse Point, FL (US)

(73) Assignee: Citrix Systems, Inc., Ft. Lauderdale, FL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/252,391

(22) Filed: Feb. 18, 1999

(65) Prior Publication Data

US 2002/0103884 A1 Aug. 1, 2002

Related U.S. Application Data

(60) Provisional application No. 60/114,099, filed on Dec. 29, 1998.

(51) Int. Cl.[7] ............................................... G06F 15/16
(52) U.S. Cl. ....................... 709/217; 709/219; 709/203; 709/328
(58) Field of Search ................................. 709/217, 300, 709/400; 714/4, 11, 7, 25, 37

(56) References Cited

U.S. PATENT DOCUMENTS

| | | | |
|---|---|---|---|
| 5,666,501 A | 9/1997 | Jones et al. | 345/348 |
| 5,671,354 A | 9/1997 | Ito et al. | 713/201 |

(List continued on next page.)

FOREIGN PATENT DOCUMENTS

| | | |
|---|---|---|
| AU | 53031/98 A | 8/1998 |
| EP | 081615 A2 | 5/1998 |
| WO | 97/18635 | 5/1997 |

OTHER PUBLICATIONS

Novell AppNote—"Accessing Network Resources with the GUI Login Utility and the NetWare Provider", Nov. 1996.

Novell AppNote—"Using the Novell Application Launcher (NAL) Utility with Client 32 for Windows 95", Nov. 1996.

(List continued on next page.)

*Primary Examiner*—Frantz B Jean
(74) *Attorney, Agent, or Firm*—Testa, Hurwitz & Thibeault, LLP

(57) ABSTRACT

An apparatus and method for determining a program neighborhood of a client node in a client-server network is described. The program neighborhood of the client node includes application programs hosted by application servers on the network. The present invention enables a user of a client node to learn of these application programs. The user is not required to know where to find such applications or to manually establish links to such applications. To make the client node aware of its program neighborhood, a host server collects application-related information corresponding to application programs hosted by the servers in the network. The application-related information can include the application name, the server location of the application, minimum capabilities required of client nodes for executing the application, and those users who are authorized to use that application. User credentials are received from the client system. The user credentials are used to filter the application-related information. Information representing those application programs that are available to the client node is transmitted from the host server to the client system for display. In a Windows-based client node, the information can be represented by a graphical icon for each available application program.

29 Claims, 9 Drawing Sheets

U.S. PATENT DOCUMENTS

| | | | |
|---|---|---|---|
| 5,689,708 A | | 11/1997 | Regnier et al. ............. 709/229 |
| 5,729,734 A | | 3/1998 | Parker et al. .................... 707/9 |
| 5,737,592 A | | 4/1998 | Nguyen et al. ................. 707/4 |
| 5,761,662 A | * | 6/1998 | Dasan .......................... 707/10 |
| 5,794,207 A | | 8/1998 | Walker et al. ................. 705/23 |
| 5,826,027 A | | 10/1998 | Pedersen et al. ............ 709/221 |
| 5,860,068 A | | 1/1999 | Cook .......................... 705/26 |
| 5,889,942 A | | 3/1999 | Orenshteyn ................. 713/201 |
| 5,930,804 A | | 7/1999 | Yu .......................... 707/104.1 |
| 6,009,410 A | * | 12/1999 | LeMole et al. ............... 705/14 |
| 6,078,956 A | | 6/2000 | Bryant et al. ............... 709/224 |
| 6,101,531 A | * | 8/2000 | Eggleston et al. .......... 709/206 |
| 6,157,953 A | | 12/2000 | Chang ........................ 709/225 |
| 6,175,854 B1 | * | 1/2001 | Bretscher .................... 709/201 |
| 6,199,753 B1 | * | 3/2001 | Tracy et al. ................. 235/375 |
| 6,266,781 B1 | * | 7/2001 | Chung et al. .................. 714/4 |
| 6,374,237 B1 | | 4/2002 | Reese ............................ 707/3 |

OTHER PUBLICATIONS

Allison, Bridget et al., "File System Security: Secure Network Data Sharing for NT and Unix", http://www.netapp.com/tech_library/1003.html, printed May 22, 2000, published 1998, 16 pages.

Yager, Tom, "OS Paradise", BYTE, Nov. 1995, pp. 81–98.

Neuman, B. Clifford et al., "Proxy–Based Authorization and Accounting for Distributed Systems", Proceedings of the International Conference on Distributed Computing Systems, US, Los Alamitos, IEEE Comp. Soc. Press, May 25, 1993, pp. 283–291.

* cited by examiner

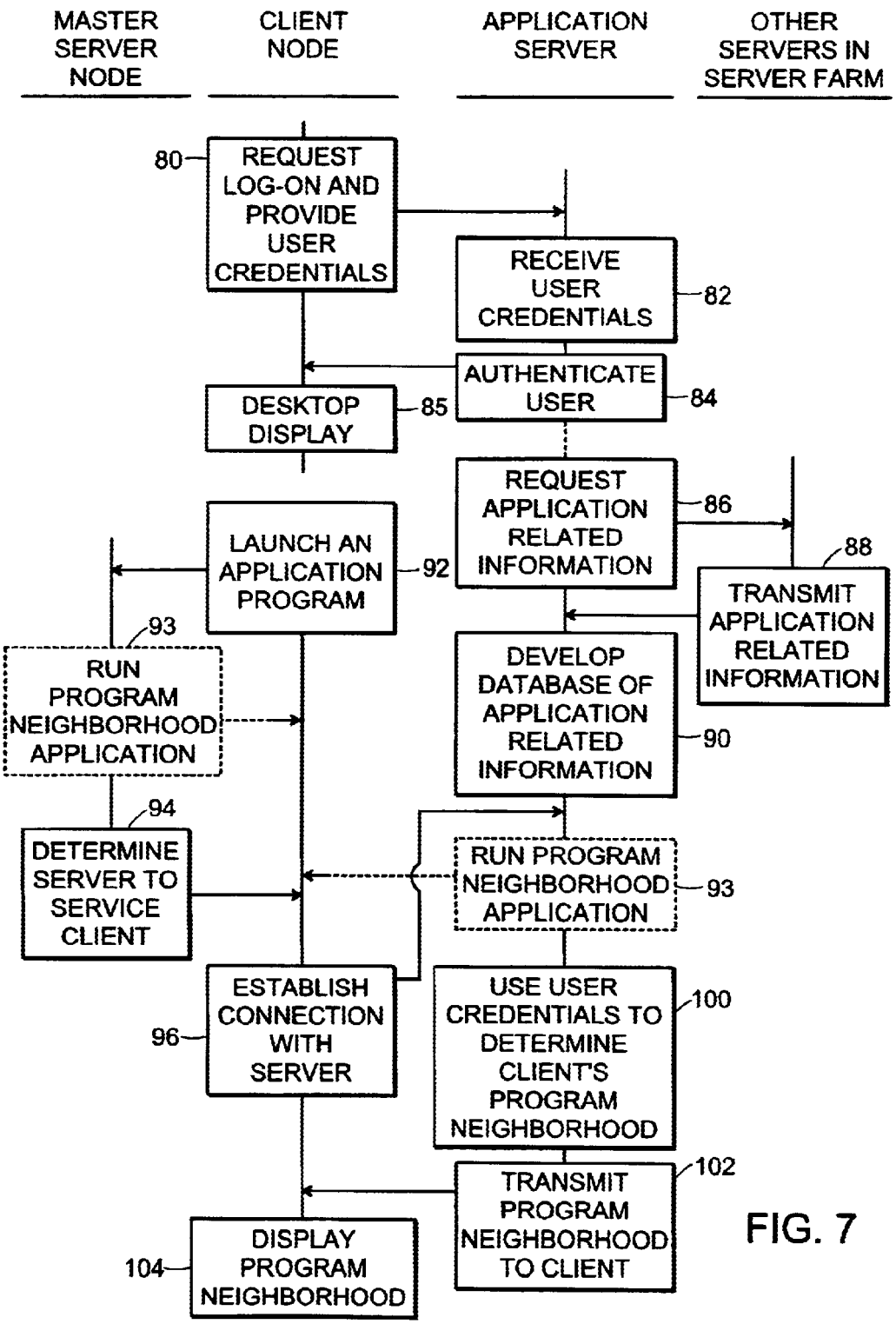

APPARATUS AND METHOD FOR DETERMINING A PROGRAM NEIGHBORHOOD FOR A CLIENT NODE IN A CLIENT-SERVER NETWORK

RELATED APPLICATION

This application claims the benefit of U.S. Provisional Application, Serial No. 60/114,099 filed Dec. 29, 1998.

FIELD OF THE INVENTION

The invention relates generally to client-server networks. More specifically, the invention relates to a method for informing a client system of application programs installed at server systems that are available to the client system for execution.

BACKGROUND OF THE INVENTION

Contemporary computer networks consist of a number of computer systems, called nodes, communicating with other computer systems via communication links. Typically, some of the nodes are client nodes and other nodes are server nodes. A client node formulates and delivers queries to a server node. A user of the client node enters the queries through a user interface operating on the client node. The server node evaluates the queries and delivers responses to the client node for display on the client user interface.

Usually, the server nodes host a variety of application programs that can be accessed and executed by client nodes. When a client node launches an application program, the execution of that application program can occur at either the client node or the server node, depending upon the computing model followed by the computer network. In a server-based computing model, the server node executes the application program, and only the control information for the client user interface is transmitted across the computer network to the client node for display. In a client-based computing model, the server node transmits the application program to the client node so that the client node can run the program using the resources of the client node.

One drawback of contemporary computer networks is that client nodes may be unaware of the application programs available for use on the server nodes. In fact, client nodes may not even be aware of each available server node on the network. To find available application programs on a particular server node, a user of the client node may need to find and gain access to that server node and perform a directory listing of the files existing on that server node. Even then, this listing might not indicate to the user those applications which the user is authorized to use.

Moreover, once the user is aware of the application programs on a server node, often that user must establish a link to those applications. Industry has developed software tools to aid the user in creating these links, e.g., Remote Application Manager manufactured by Citrix Systems, Inc., of Ft. Lauderdale, Fla. The Remote Application Manager is an application program installed on the client node. This application program guides an administrator of the client node to enter information that establishes a link to an application published on a particular server node. The administrator supplies such information as the name of the session, the protocol for accessing the server node, the server name or IP address or the published application. Approaches of this kind require that the administrator know the information and understand the details of protocols and domains in order to establish the connection.

SUMMARY OF THE INVENTION

The present invention enables the user of a client system to become informed about available application programs on servers in a network without requiring the user to know where to find such applications or to enter technical information necessary to link to such applications.

In one aspect, the invention relates to a method for presenting application programs to a client system in a network including the client system and a plurality of servers. The servers include a host server which receives application-related information corresponding to application programs hosted by a plurality of servers in a network. User credentials are received from the client system. Whether each hosted application program is available to the client system for execution is determined based on the user credentials and the received application-related information. Information is transmitted from the host server to the client system indicating to the client system each hosted application that is available to the client system for execution.

The host server can authenticate the client system based on received user credentials. When the client system selects one of the available applications for execution, that application can be executed without requiring additional input of user credentials by a user of the client system, although the selected application is at a server other than the host server.

In one embodiment, a connection is established between the client system and the host server using an Independent Computing Architecture (ICA) protocol. The ICA protocol can establish a virtual channel to transmit information to the client system indicating each hosted application program that is available to the client system.

A request to execute one of the available hosted application programs can be received on the connection. In response to the request, a second connection between the client system and the host server can be established to exchange information associated with an execution of the requested application program. In another embodiment, a connection between the host server and a second server hosting the requested application can be established in response to the request. Information associated with an execution of the requested application program can be exchanged between the second server and the client system via the host server.

A second request to execute a second one of the available hosted application programs can be received on the connection between the host server and the client system. Another connection between the host server and a third server hosting the requested application can be established in response to the second request. Information associated with an execution of the second requested application program can be exchanged between the third server and the client system via the host server. Information received from the second and third servers can be merged for transmission to the client system.

In still another embodiment, application information can be provided by the host server to the client system in response to the first request. A second connection can be established between the client system and a second server hosting the requested application in response to the provided application information.

The host server can transmit the available application information in response to a request by the client system. The transmitted information can produce a graphical user interface display at the client system having icons representing the available application programs. The transmitted information can also disclose each hosted application program that the client system is unauthorized to use.

The host server can communicate with each of the other servers to determine the application programs hosted by those other servers and to develop a database for storing the application-related information. The database can be accessible to each of the other servers of the plurality, or each of the other servers can maintain a database for storing the application-related information.

In another aspect, the invention relates to a method for presenting to a client system each application hosted by a server that is available to the client system. User credentials are received from the client system. Application-related information is maintained by the server. Whether each application hosted by the server is available to the client system for execution is determined based on the user credentials and the application-related information. Information indicating each application that is available to the client system is transmitted from the server to the client system.

In another aspect, the invention relates to a server comprising a service module that collects application-related information corresponding to application programs hosted by the plurality of servers. A database stores the collected application-related information. A receiver receives user credentials from the client system. The service module determines for each application program hosted by the plurality of servers whether that hosted application program is available for use by the user of the client system based on the user credentials and the application-related information stored in the database. A transmitter transmits information to the client system.

The service module can transmit a datagram to other servers in the plurality to collect the application-related information corresponding to the application programs hosted by those servers. The transmitted information discloses to a user of the client system each hosted application program that is available for use by the user of the client system. The transmitter can transmit available application information using a virtual channel communications protocol.

BRIEF DESCRIPTION OF THE DRAWINGS

The invention is pointed out with particularity in the appended claims. The above and further advantages of the invention may be better understood by referring to the following description in conjunction with the accompanying drawings, in which:

FIG. 7 is a flow chart representation of an embodiment of a process by which a client node is informed as to the availability for use of application programs on the application servers.

DETAILED DESCRIPTION OF THE INVENTION

Figure 1:
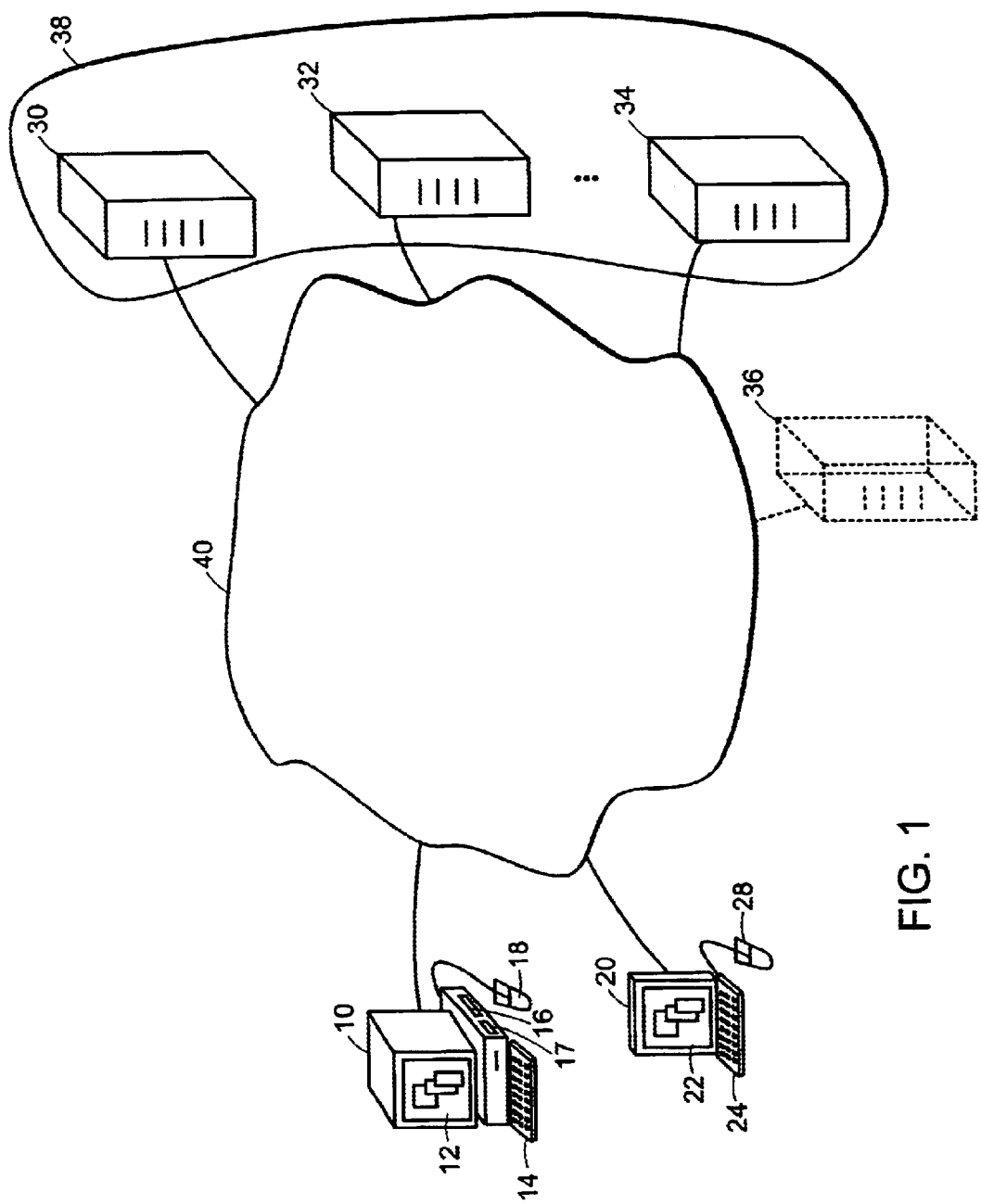
FIG. 1 is a diagram of an embodiment of client nodes in communication with a group of server nodes via a network, wherein a program neighborhood of a client node can be determined according to the principles of the invention.

FIG. 1 shows a first computing system (client node) 10 and a second computing system (client node) 20 in communication with computing systems (application servers) 30, 32, 34, and 36 over a network 40. The network 40 can be a local-area network (LAN) or a wide area network (WAN) such as the Internet or the World Wide Web. Users of the client nodes 10, 20 can be connected to the network 40 through a variety of connections including standard telephone lines, LAN or WAN links (e.g., T1, T3, 56kb, X.25), broadband connections (ISDN, Frame Relay, ATM), and wireless connections. The connections can be established using a variety of communication protocols (e.g., TCP/IP, IPX, SPX, NetBIOS, Ethernet, RS232, and direct asynchronous connections).

The client node 10 can be any personal computer (e.g., 286, 386, 486, Pentium, Pentium II, Macintosh computer), Windows-based terminal, Network Computer, wireless device, information appliance, RISC Power PC, X-device, workstation, mini computer, main frame computer or other computing device that has a windows-based desktop and sufficient persistent storage for executing application programs downloaded from the application servers 30, 32, 34 across the network 40. Windows-oriented platforms supported by the client node 10 can include Windows 3.x, Windows 95, Windows 98, Windows NT 3.51, Windows NT 4.0, Windows CE, Macintosh, Java, and Unix. The client node 10 can include a display screen 12, a keyboard 14, memory 16 for storing downloaded application programs, a processor 17, and a mouse 18. The memory 16 can provide persistent or volatile storage. The processor 17 can execute the application programs locally on the client node 10 and display a resulting windows-based desktop on the display screen 12. Such local processing on the client node 10 is according to the above-described client-based computing model.

Alternatively, the client node 20 can be any terminal (windows or non-windows based), or thin-client device operating according to a server-based computing model. In a server-based computing model, the execution of application programs occurs entirely on the application servers 30, 32, 34, and the user interface, keystrokes, and mouse movements are transmitted over the network 40 to the client node 20. The user interface can be text driven (e.g., DOS) or graphically driven (e.g., Windows). Platforms that can be supported by the client node 20 include DOS and Windows CE for windows-based terminals. The client node 20 includes a display screen 22, a keyboard 24, a mouse 28, a processor (not shown), and persistent storage (not shown).

The application servers 30, 32, 34, and 36 can be any computing device that controls access to other portions of the network (e.g., workstations, printers). It is to be understood that more or fewer application servers can be connected to the network 40. The servers 30, 32, 34, and 36 can operate according to either a client-based computing model or a server-based computing model as described above.

Each application server 30, 32, 34, and 36 hosts one or more application programs that can be accessed by the client nodes 10 and 20. Applications made available to client nodes for use are referred to as published applications. Examples of such applications include word processing programs such as MICROSOFT WORD® and spreadsheet programs such as MICROSOFT EXCEL®, both manufactured by Microsoft Corporation of Redmond, Wash., financial reporting programs, customer registration programs, programs providing technical support information, customer database applications, or application set managers.

The servers 30, 32, and 34 can belong to the same domain 38. In the network 40, a domain is a sub-network comprising a group of application servers and client nodes under control of one security database. A domain can include one or more "server farms." (A server farm is a group of servers that are linked together to act as a single server system to provide centralized administration.) Conversely, a server farm can include one or more domains. For servers of two different domains to belong to the same server farm, a trust relationship may need to exist between the domains. A trust relationship is an association between the different domains that allows a user to access the resources associated with each domain with just one log-on authentication.

In one embodiment, the application server 36 is in a different domain than the domain 38. In another embodiment, the application server 36 is in the same domain as servers 30, 32, and 34. For either embodiment, application servers 30, 32, and 34 can belong to one server farm, while the server 36 belongs to another server farm, or all of the application servers 30, 32, 34, and 36 can belong to the same server farm. When a new server is connected to the network 40, the new server joins either an existing server farm or starts a new server farm.

The network 40 can include a master server node for performing load-level balancing among the application servers 30, 32, 34, and 36. The master server node can be one of the application servers 30, 32, 34, or 36. The master server node includes a list of server addresses and load information corresponding to each of the other application servers. The master server node can direct the client node to a particular server node on which to execute an application based on the list of available servers and corresponding load levels.

Program Neighborhood

According to the principles of the invention, a user of either client node 10, 20 is able to learn of the availability of application programs hosted by the application servers 30, 32, 34, and 36 in the network 40 without requiring the user to know where to find such applications or to enter technical information necessary to link to such applications. These available application programs comprise the "program neighborhood" of the user. A system for determining a program neighborhood for a client node includes an application program (hereafter referred to as the "Program Neighborhood" application), memory for storing components of the application program, and a processor for executing the application program.

The Program Neighborhood application can be installed in memory of the client node 10 and/or on the application servers 30, 32, 34, and 36 as described below. The Program Neighborhood application is a collection of services, applications program interfaces (APIs), and user interface (UI) programs that disclose to users of the client nodes 10, 20 those application programs hosted by the application servers that each client node is authorized to use (e.g., execute).

An application server operating according to the Program Neighborhood application collects application-related information from each of the application servers in a server farm. The application-related information for each hosted application can be a variety of information including, for example, an address of the server hosting that application, the application name, the users or groups of users who are authorized to use that application, and the minimum capabilities required of the client node before establishing a connection to run the application. For example, the application may stream video data, and therefore a required minimum capability is that the client node supports video data. Other examples are that the client node can support audio data or can process encrypted data. The application-related information can be stored in a database as described later in the specification.

When a client node logs onto the network 40, the user of the client node provides user credentials. User credentials typically include the username of the client node, the password of the user, and the domain name for which the user is authorized. The user credentials can be obtained from smart cards, social security numbers, user passwords, personal identification (PIN) numbers, or any other means by which the identification of the user of the client node can be obtained and submitted for authentication. The server responding to the client node can authenticate the user based on the user credentials. The user credentials can be stored wherever the Program Neighborhood application is executing. When the client node 10 executes Program Neighborhood application, the user credentials can be stored at the client node 10. When an application server is executing the Program Neighborhood, the user credentials can be stored at that server.

From the user credentials and the application-related information, the server can also determine which application programs hosted by the application servers are available for use by the user of the client node. The server transmits information representing the available application programs to the client node. This process eliminates the need for a user of the client node to set-up application connections. Also, an administrator of the server can control access to applications among the various client node users.

The user authentication performed by the server can suffice to authorize the use of each hosted application program presented to the client node, although such applications may reside at another server. Accordingly, when the client node launches (i.e., initiates execution of) one of the hosted applications, additional input of user credentials by the user may be unnecessary to authenticate use of that application. Thus, a single entry of the user credentials can serve to determine the available applications and to authorize the launching of such applications without an additional, manual log-on authentication process by the client user.

Either a client node 10, 20 or an application server can launch the Program Neighborhood application as described in connection with FIGS. 2A–2B. The results are displayed on the display screen 12, 22 of the client node 10, 20. In a graphical windows-based implementation, the results can be displayed in a Program Neighborhood graphical window and each authorized application program can be represented by a graphical icon in that window.

One embodiment of the Program Neighborhood application filters out application programs that the client node 10, 20 is unauthorized to use and displays only authorized (i.e., available) programs. In other embodiments, the Program Neighborhood application can display authorized and unauthorized applications. When unauthorized applications are not filtered from the display, a notice can be provided indicating that such applications are unavailable. Alternatively, the Program Neighborhood application can report all applications hosted by the application servers 30, 32, 34, 36 to the user of a client node, without identifying which applications the client node 10, 20 is authorized or unauthorized to execute. Authorization can be subsequently determined when the client node 10, 20 attempts to run one of those applications.

Figure 2A:
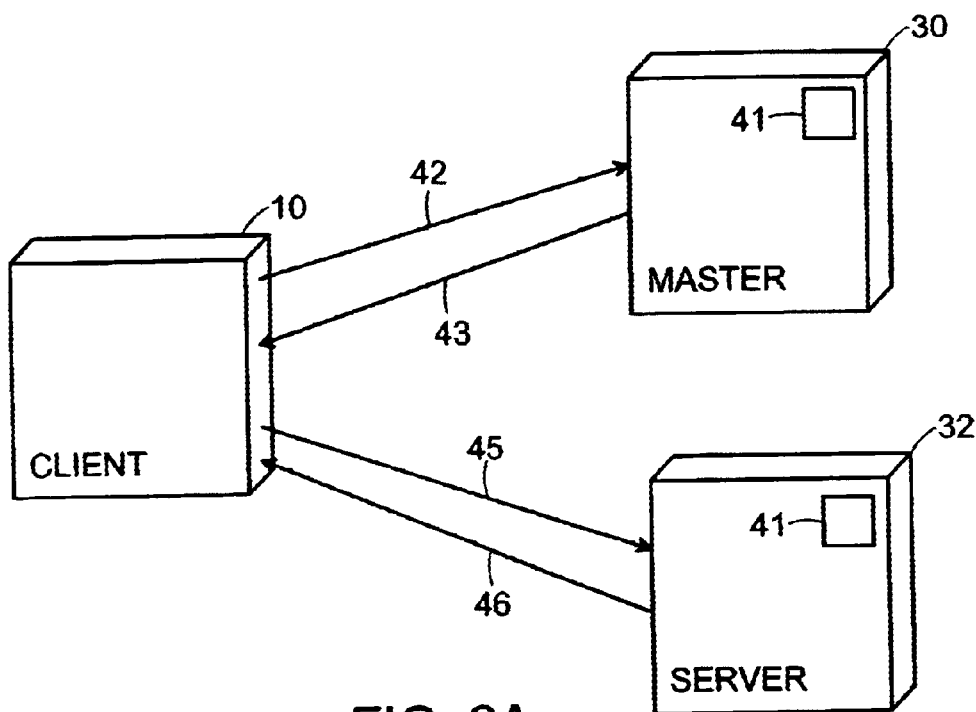
FIG. 2A is a block diagram illustrating an exemplary process by which one of the server nodes can initiate execution of an application program for determining the program neighborhood of a client node.

FIG. 2A shows an exemplary process by which a server launches the Program Neighborhood (PN) application and presents results of the PN application to the client node 10. The server can launch the PN application in response to a request 42 by the client node 10 for a particular application program. The request passes to the master server node, in this example server 30. The master server node 30, taking load-balancing and application availability into account, indicates (arrow 43) to the client node 10 that the sought-after application is available on server 32. The client node 10 and server 32 establish a connection (arrows 45 and 46). By this connection, the server 32 can transfer the executable code of the particular application to the client node 10, when the client node 10 and server 32 are operating according to the client-based computing model. Alternatively, the server 32 can execute the particular application and transfer the graphical user interface to the client node 10, when the client node 10 and server 32 are operating according to the server-based computing model. In addition, either the master server node 30 or the server 32 can execute the Program Neighborhood application 41 and push the results (arrows 43 or 46) back to the client node 10 so that when the client node 10 requests the Program Neighborhood application, the program neighborhood results are already available at the client node 10.

Figure 2B:
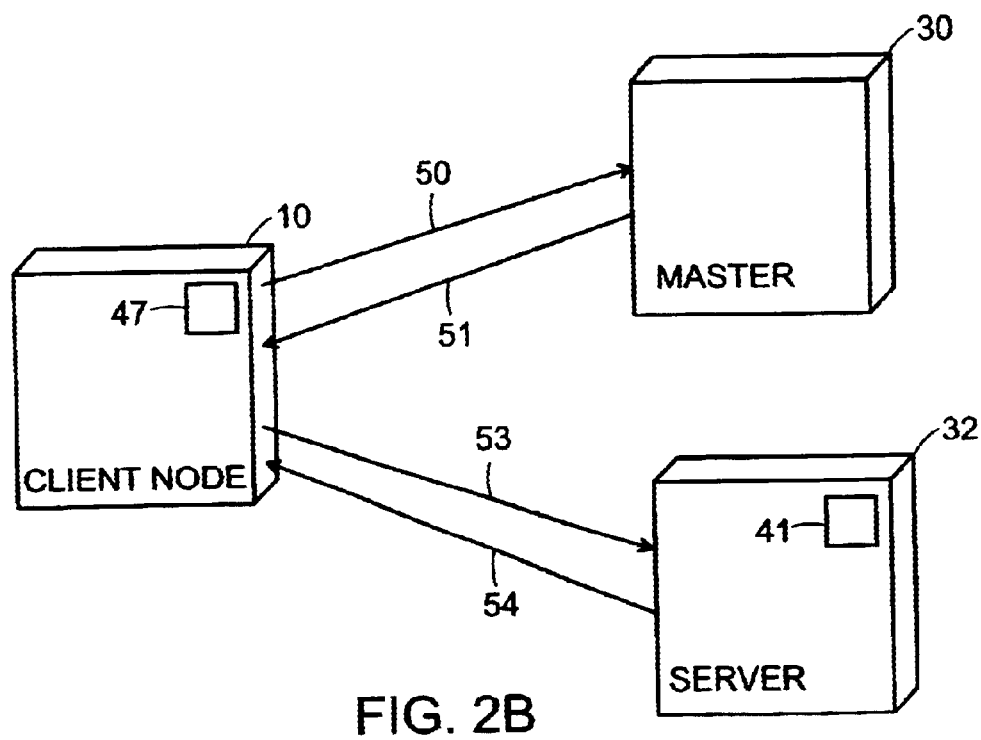
FIG. 2B is a block diagram illustrating an exemplary process by which a client node can initiate execution of an application program for determining the program neighborhood of that client node.

FIG. 2B shows another exemplary process by which the client node 10 initiates execution of the Program Neighborhood application and a server presents the results of the PN application to the client node 10. The client node 10 launches the Program Neighborhood application (e.g., by clicking on the Program Neighborhood icon 41 representing the application). The request 50 for the PN application is directed to the master server node, in this example server 30. The master server node 30 can execute the Program Neighborhood application, if the application is on the master server node 30, and return the results to the client node 10. Alternatively, the master server node 30 can indicate (arrow 51) to the client node 10 that the Program Neighborhood application 41 is available on another server, in this example server 32. The client node 10 and server 32 establish a connection (arrows 53 and 54) by which the client node 10 requests execution of the Program Neighborhood application 41. The server 32 can execute the application 41 and transfer the results (i.e., the graphical user interface) to the client node 10.

Figure 3A:
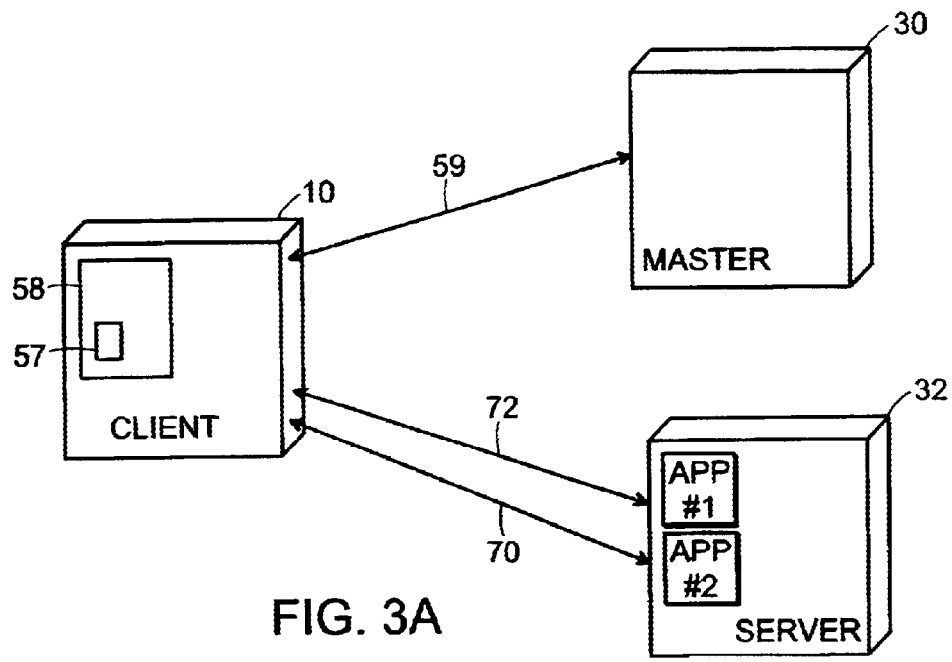
FIGS. 3A, 3B, and 3C are block diagrams illustrating exemplary processes by which a client node can launch an application program from a Program Neighborhood window displayed at that client node.

FIG. 3A shows an exemplary process of communication among the client node 10, the master server node, in this example server 30, and the server 32. The client node 10 has an active connection 72 with the server 32. The client node 10 and server 32 can use the active connection 72 to exchange information regarding the execution of a first application program. The user credentials of the client node 10 are stored at the client node. Such storage of the user credentials can be in cache memory or persistent storage.

In this embodiment, the Program Neighborhood application runs on the client node 10. The client node display has a Program Neighborhood window 58 in which appears a graphical icon 57 representing a second application program. A user of the client node 10 can launch the second application program by double-clicking the icon 57 with the mouse. The request passes to the master server node 30 via a connection 59. The master server node 30 indicates to the client node 10 via the connection 59 that the sought-after application is available on server 32. The client node 10 signals the server 32 to establish a second connection 70. The server 32 requests the user credentials from the client node 10 to authenticate access to the second application program. Upon a successful authentication, the client node 10 and server 32 establish the second connection 70 and exchange information regarding the execution of the second application program. Accordingly, the client node 10 and the server 32 communicate with each other over multiple connections.

Figure 3B:
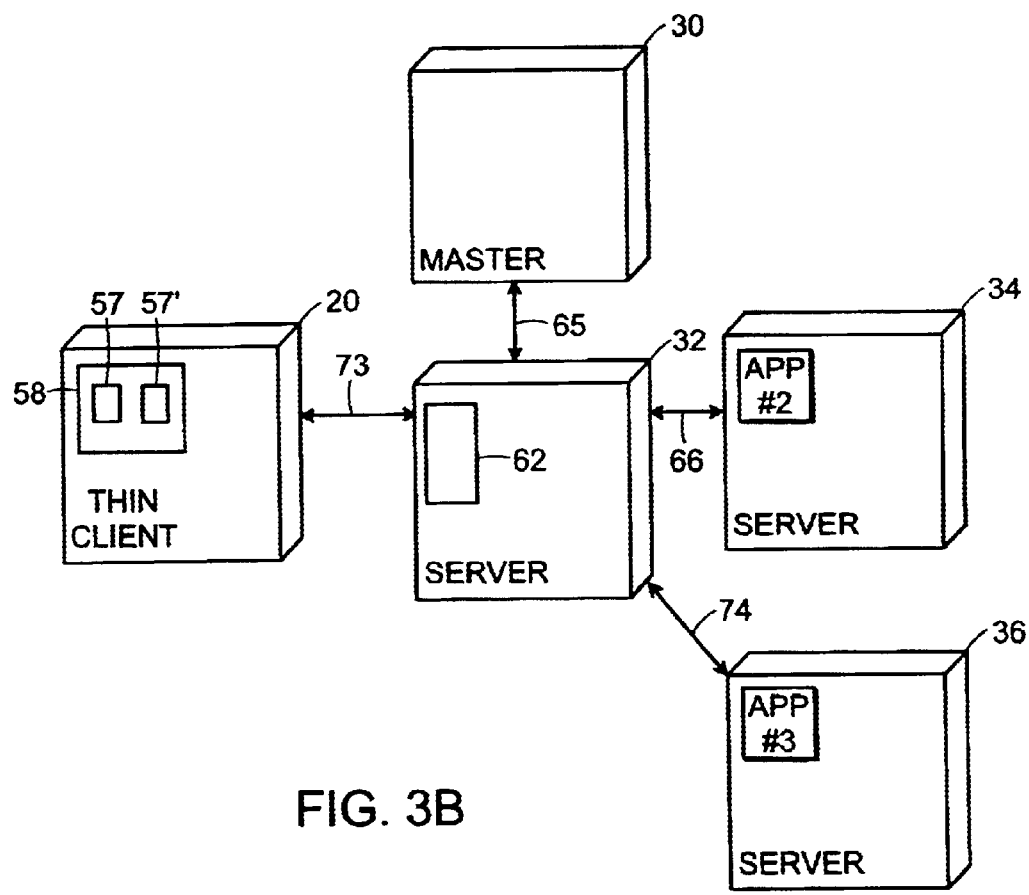

FIG. 3B shows an exemplary process of communication among the client node 20, the master server node, in this example server 30, and servers 32, 34, and 36. The client node 20 has an active connection 73 with the server 32. The client node 20 and server 32 can use the active connection 73 to exchange information regarding the execution of a first application program. The user credentials of the client node 20 are stored at the server 32 in cache memory or in persistent storage.

In this embodiment, the Program Neighborhood application runs on the server 32. The server 32 includes software providing a server-based client engine 62, enabling the server 32 to operate in the capacity of the client node 20. The client node 20 display has a Program Neighborhood window 58 in which appears graphical icons 57, 57' representing a second application program and a third application program, respectively. A user of the client node 20 can launch the second application program by double-clicking the icon 57. The request to launch the second application program passes to the server 32 via active connection 73, and the server 32 forwards the request to the master server node 30 (arrow 65).

The master server node 30 indicates (arrow 65) to the server 32 that the sought-after application is available on server 34. The server 32 contacts the server 34 to establish a connection 66. To authenticate access to the application, the server 34 obtains the user credentials of the client node 20 from the server 32. The server 32 and server 34 establish the connection (arrow 66) by which the server 32 requests execution of the second application and the server 34 returns the graphical user interface results to the server 32. The server 32 forwards the graphical user interface results to the client node 20, where the results are displayed. Accordingly, the information exchanged between the client node 20 and the server 34 "passes through" the server 32.

Similarly, the client node 20 can launch the third application program by double-clicking the icon 57'. The request to launch the third application program passes to the server 32. The server 32 forwards the request to the master server node 30, which considers load-balancing and application program availability to determine which server can handle the request. In this example, the master server node indicates that server 36 can run the third application program.

The server 32 and the server 36 establish a connection (arrow 74) by which the server 32 requests execution of the third application program, and the server 36 returns the graphical user interface results to the server 32. To permit execution of the third application program, the server 36 can authenticate the user credentials of the client node 20, which are obtained from the server 32. The server 32 forwards the graphical user interface results to the client node 20 where the results are displayed. Accordingly, the results of executing the third application program pass between the client node 20 and the server 36 through the server 32.

From this illustration it should be understood that client node 20 can run multiple application programs through one connection with the server 32, while the server 32 maintains multiple connections (in this example, one connection with server 34 and a second connection with server 36). Also, the server 32 merges the information received from the server 34 with the information received from the server 36 into one data stream for transmission to the client node 20.

Figure 3C:
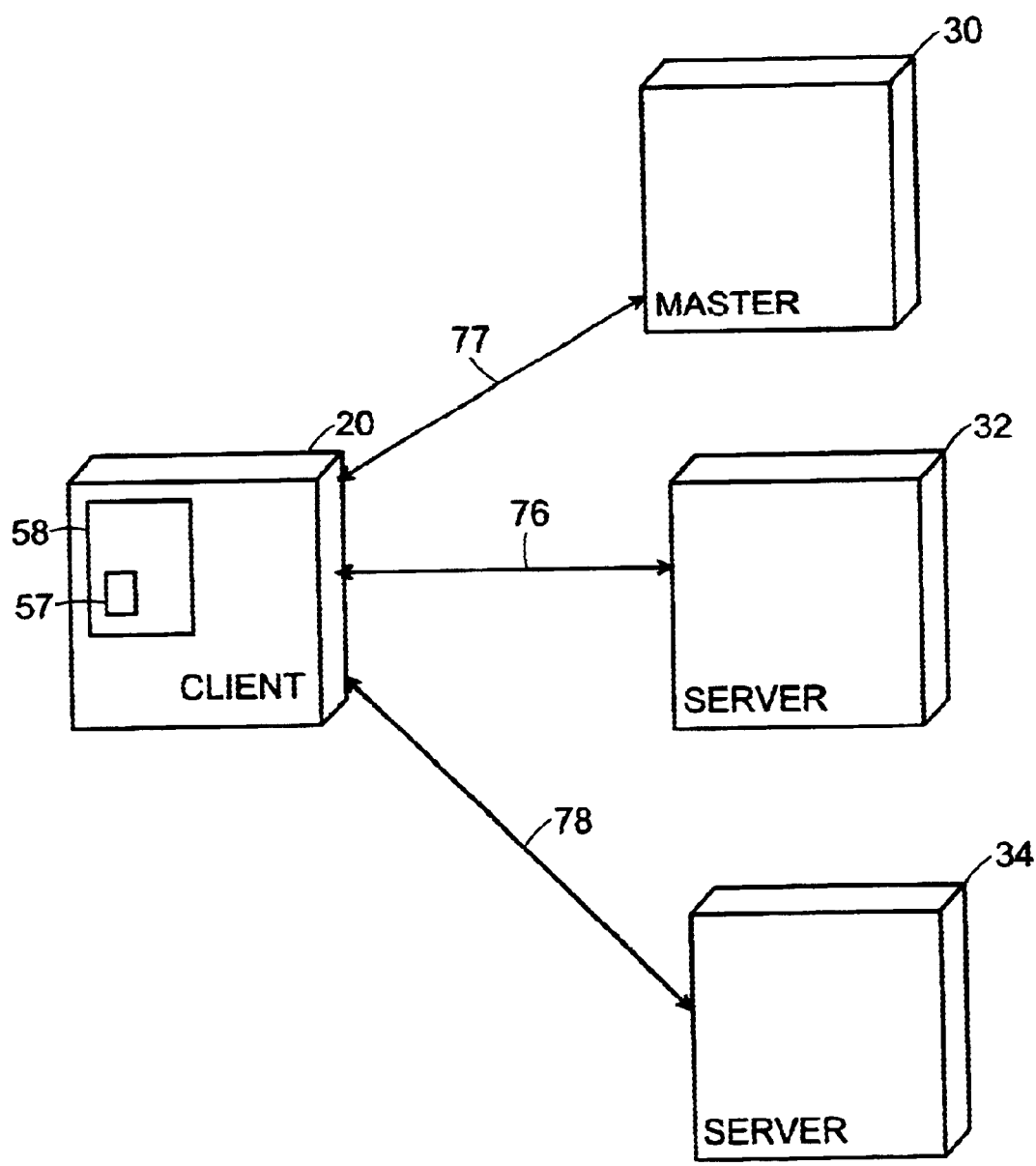

FIG. 3C shows an exemplary process of communication among the client node 20, the master server node, in this example server 30, and servers 32 and 34. The client node 20 has an active connection 76 with the server 32. The client node 20 and server 32 can use the active connection 76 to exchange information regarding the execution of a first application program. The client node 20 can store the user credentials in cache memory or in persistent storage.

In this embodiment, the Program Neighborhood application runs on the server 32. The client node 20 display has a Program Neighborhood window 58 in which appears a graphical icon 57 representing a second application program. A user of the client node 20 can launch the second application program by double-clicking the icon 57. The request to launch the second application program passes to the server 32. The server 32 responds (i.e., "calls back") to the client node 20 by returning application-related information such as the name of the application and capabilities needed by the client node 20 for the second application to run.

With the information provided by the server 32, the client node 20 then communicates with the master server node 30 via connection 77 to determine the server for executing the second application program. In this example, that server is server 34. The client node 20 then establishes a connection 78 to the server 34. Server 34 requests the user credentials from the client node 20 to authenticate the user of the client node 20. The second application program executes on the server 34, and the server 34 returns the graphical user interface to the client node 20 via the established connection 78. Accordingly, the client node 20 can have multiple active connections between the multiple servers.

Figure 4:
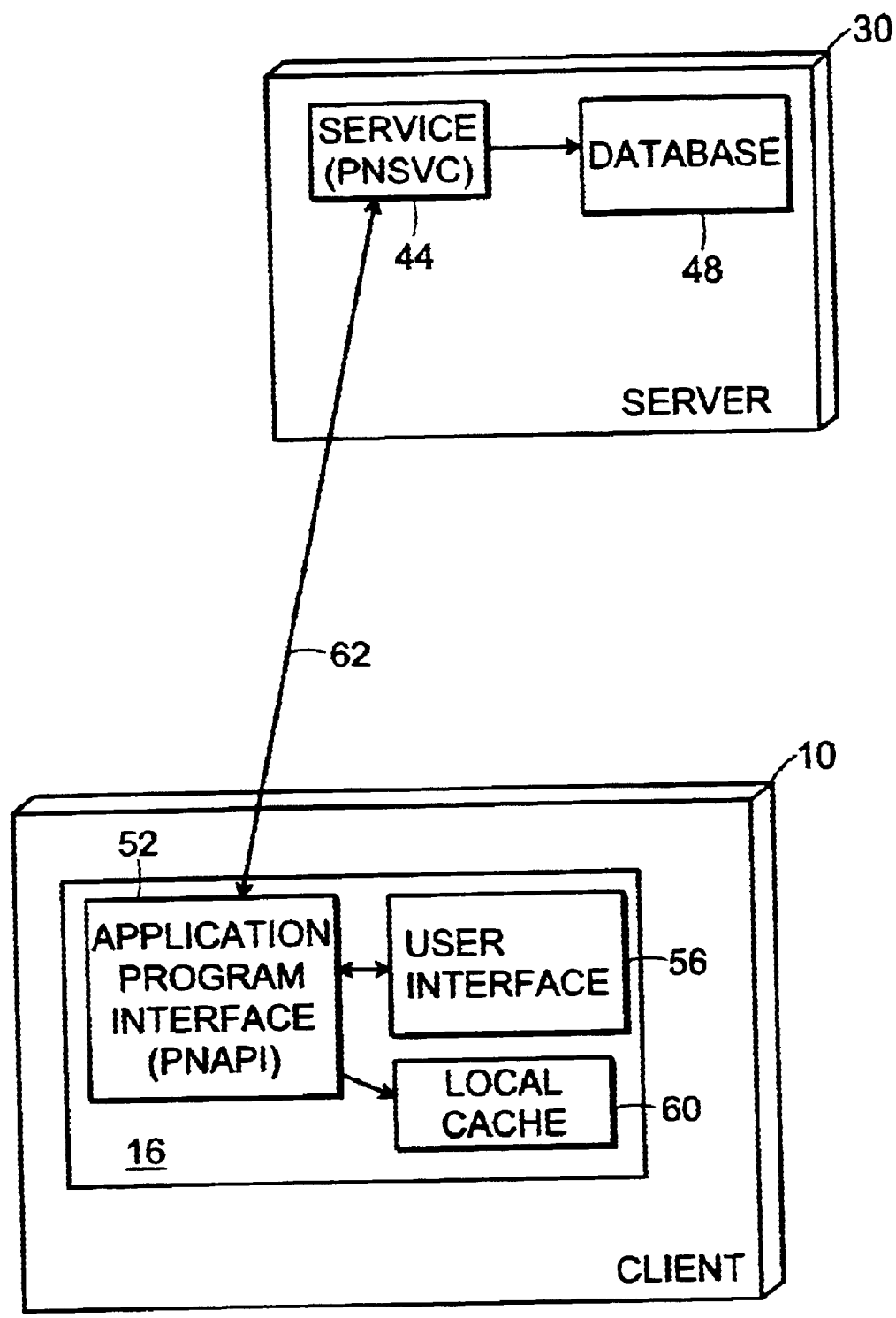
FIG. 4 is a block diagram of a client-based computing embodiment in which a client node having an installed program neighborhood application of the invention is in communication with one of the server nodes.

FIG. 4 illustrates an exemplary arrangement of program components for a client-based implementation of the Program Neighborhood application. A client-based implementation of Program Neighborhood application can be used in a network using either the server-based computing model, in which the servers execute the Program Neighborhood application, or the client-based computing model in which the client node 10 executes the Program Neighborhood application locally. The Program Neighborhood application includes a Program Neighborhood Service (PNSVC) component 44, an Application Database component 48, a Program Neighborhood Application Program Interface (PNAPI) component 52, a Program Neighborhood User Interface component 56, and a local cache 60.

The application server 30, for example, includes the service component (PNSVC) 44 and the application database 48. The client node 10, which is a representative example of a client node that can support a client-based implementation of the Program Neighborhood application, includes the application program interface PNAPI 52, the user interface user interface component 56, and the local cache 60 components. The PNAPI 52 communicates with the user interface component 56 and the local cache 60. The PNSVC 44 communicates with the application database 48 and with the PNAPI 52 on the client node 10 via communications link 62.

The communications link 62 can be established by, for example, an Independent Computing Architecture (ICA). ICA is a general-purpose presentation services protocol designed to run over industry standard network protocols, such as TCP/IP, IPX/SPX, NetBEUI, using industry-standard transport protocols, such as ISDN, frame relay, and asynchronous transfer mode (ATM). The ICA protocol provides for virtual channels, which are session-oriented transmission connections that can be used by application-layer code to issue commands for exchanging data. The virtual channel commands are designed to be closely integrated with the functions of client nodes. One type of virtual channel connection supported by the ICA protocol is a Program Neighborhood virtual channel.

The Program Neighborhood virtual channel protocol can include four groups of commands:

(1) initialization-related commands;

(2) single authentication related commands that can be supported by each client node wanting a copy of the user credentials;

(3) application data related commands for implementing the Program Neighborhood user interface; and (4) application launch callback-related commands for running the user interface on an application server.

Application Database

The application database 48 is a cache of the authorized user and group information for all the public (i.e., published) applications in a server farm or in a group of trusted domains. Each server in a server farm can maintain its own application-related information in persistent storage and build up the database 48 in volatile storage. In another embodiment, all collected application-related information in the database 48 can be stored in persistent storage and made accessible to each other server in the server farm. The database 48 can be implemented in a proprietary format (e.g., as a linked list in memory) or using Novell's Directory Services (NDS) or any directory service adhering to the X.500 standard defined by the International Telecommunication Union (ITU) for distributed electronic directories.

The application database 48 includes a list of application servers. Each server in the list has an associated set of applications. Associated with each application is application-related information that can include the application name, a list of servers, and client users that are authorized to use that application. An overly-simplified example of the application-related information maintained in the database is illustrated by the following Table 1. Users A and B are users of the client nodes 10, 20, "n/a" indicates that the application is hosted, but is not available to client node users, and "-" indicates that the application is not hosted.

TABLE 1

| | Applications | | | |
|---|---|---|---|---|
| Server Name | SpreadSheet | Customer Database | Word Processor | Calculator |
| Server 30 | User A | User B | n/a | — |
| Server 32 | User B | n/a | User A | — |
| Server 34 | — | — | — | User A<br>User B |

Table 1 shows a list of servers 30, 32, 34, the applications hosted by the servers, (SpreadSheet, Customer Database, Word Processor, and Calculator), and those users who are authorized to use the applications. For example, the server 30 hosts the SpreadSheet program, the Customer Database and the Word Processor. User A is authorized to use the SpreadSheet, User B is authorized to use the Customer Database, and no users are authorized to use the Word Processor. It is to be understood that other techniques can be used to indicate who is authorized to use a particular application. For example, the user information stored in the database can be used to indicate those users who are unauthorized to use a particular application rather than those who are authorized.

To obtain the information that is stored in the database 48, the server 30 obtains the application-related information from each other server in the server farm regarding the applications on those servers, including control information that indicates which client users and servers are permitted to access each particular application. The application-related information maintained in the database may or may not persist across re-boots of the server 30.

The application database 48 can be a central database that is stored at the application servers 30, 32, and 34 and is accessible to all of the servers in the server farm. Accordingly, the application-related information can be available for use by other servers such as those servers which perform published application authentication during session log-on and application launching. In another embodiment, the application database 48 can be maintained at each of the application servers 30, 32, and 34 based upon the information that each server obtains from communications with each other server in the server farm.

Program Neighborhood Service Program (PNSVC)

Each server 30, 32, 34 and 36 having the Program Neighborhood application installed thereon executes the PNSVC software 44. The PNSVC software 44, operating on each server 30, 32, 34 and 36 establishes a communication link (e.g., a named pipe) with each other server. The servers 30, 32, 34 and 36 exchange the application-related information on the named pipes. In another embodiment, the PNSVC software 44 collects the application-related information from the other servers in the server farm through remote registry calls (e.g., the service component 44 transmits a datagram to other servers in the plurality requesting the application-related information corresponding to the application programs hosted by those servers). The PNSVC 44 software also maintains the relationships of groups and users to published applications in the application database 48 and accesses the information when authenticating a client user. An administrator of the server 30 can use a user interface to configure the PNSVC 44.

Other functions of the PNSVC software 44 include implementing the services and functions requested by the PNAPI 52 and communicating with the PNAPI 52 on the client node 10 using a Program Neighborhood virtual device driver (VDPN). The VDPN operates according to the Program Neighborhood virtual channel protocol described above for establishing and maintaining an ICA connection.

Program Neighborhood Application Program Interface (PNAPI)

The PNAPI 52 is a set of software functions or services that are used by the Program Neighborhood application to perform various operations (e.g., open windows on a display screen, open files, and display message boxes). The PNAPI 52 provides a generic mechanism for launching application objects (e.g., icons) produced by running the Program Neighborhood application and application objects in a legacy (i.e., predecessor or existing for some time) client user interface. When the client node 10 launches an available application, the launch mechanism can launch the application on the server 30, if necessary (e.g., when the client node 10 does not have the resources to locally execute the application).

The PNAPI 52 provides all published application information to the user interface component 56 for display on the screen 12 (FIG. 1) of the client node 10. The PNAPI 52 also manages server farm log-ons in a local database of logon credentials (e.g., passwords) for users of the client node 10 to support the single authentication feature. Credentials may or may not be persistent across bootings (power-off and on cycles) of the client node 10.

The PNAPI 52 provides automatic and manual management for Program Neighborhood application objects stored in the local cache 60. The local cache 60 can either be refreshed manually by the user of the client node 10, or at a user-definable refresh rate, or by the server at any time during a connection. In a Windows implementation, the PNAPI 52 can build remote application file associations and manage the "Start" menu and desktop icons for application object shortcuts.

Program Neighborhood User Interface

The user interface module 56 interfaces the PNAPI 52 and can be a functional superset of an existing client-user interface (e.g., Remote Application Manager). The user interface module 56 accesses the information stored in the local cache 60 through the PNAPI 52 and visually presents that information to the user on the display screen 12 (FIG. 1) of the client node 10. The displayed information is a mixture of information generated by a user of the client node 10 and information obtained by the Program Neighborhood application. The user interface module 56 can also show the user all applications that the user is currently running and all active and disconnected sessions.

In a windows-based embodiment, the user interface module 56 can present a variety of graphical components, such as windows and pull-down menus, to be displayed on the display screen 12. (FIG. 1) A display of a combination of such graphical user interface components is generally referred to as a "desktop." A desktop produced by the user interface module 56 can include a Program Neighborhood window displaying the neighborhood of application programs available to the user of the client node 10 for use. These application programs are a filtered combination of the published applications hosted by a server farm on the network. The user interface module 56 can generate a Program Neighborhood window for each server farm or merge the applications from different server farms under a single Program Neighborhood window.

At a top level, the Program Neighborhood window includes a folder for each server farm. Clicking on one of the folders with the mouse 18 (FIG. 1) produces a window containing a representation (e.g., an icon) of each hosted application available to the user, e.g., see FIGS. 6A and 6B. The Program Neighborhood window becomes the focal point for launching published applications, and the user interface module 56 can be used to launch applications through the PNAPI 52. For example, the user of the client node 10 can use the mouse 18 to select one of the displayed icons and launch the associated application.

A feature of a client-based implementation is that the user can browse the objects displayed in the Program Neighborhood window although the client node is offline, that is, the ICA connection 62 is inactive. Also, a user of the client node 10 can drag application objects and folders out of the Program Neighborhood window and into other graphical components (e.g., other windows, folders, etc.) of the desktop.

Figure 5:
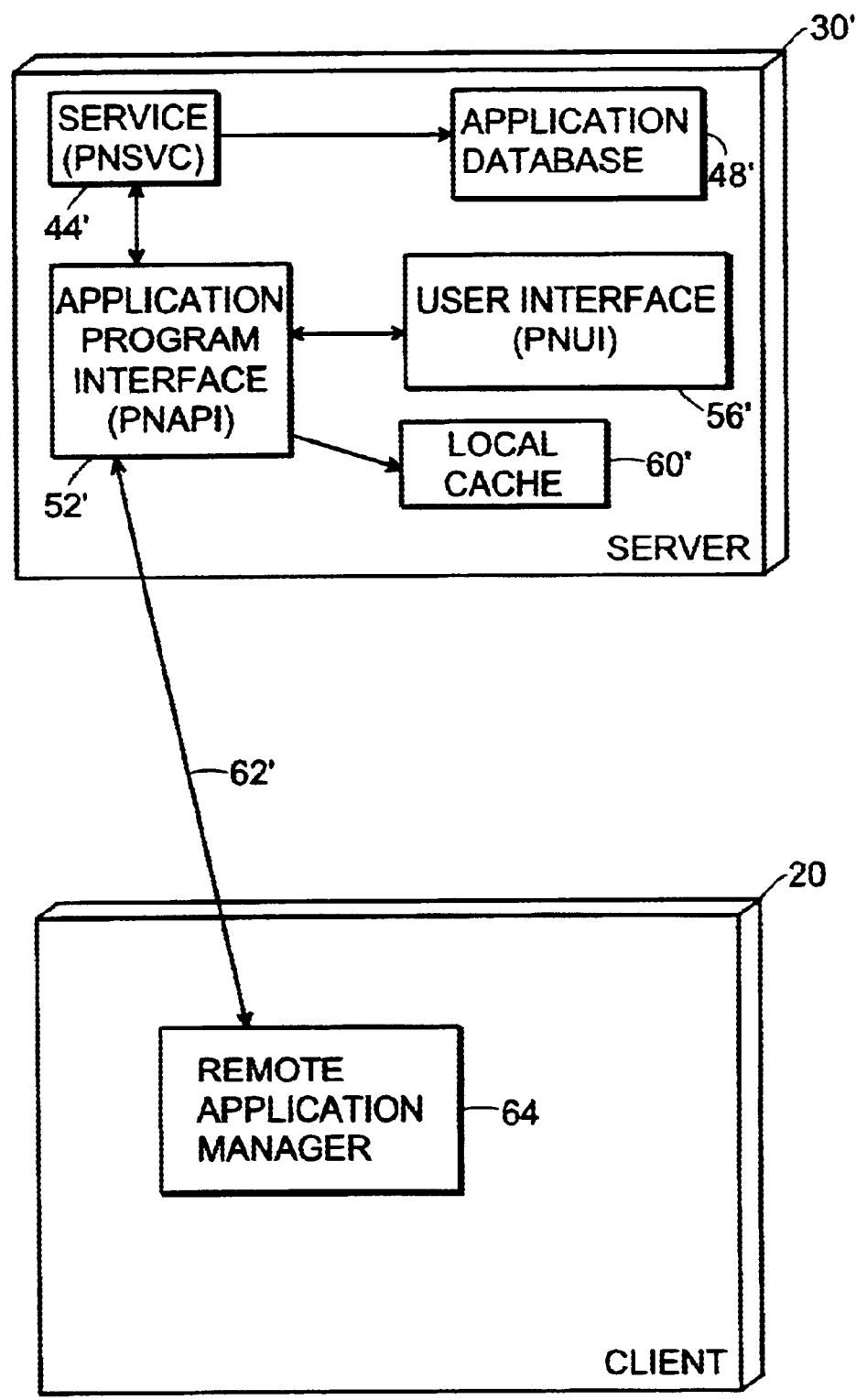
FIG. 5 is a block diagram of a server-based computing embodiment in which a client node is in communication with a server node having an installed program neighborhood application program of the invention.

FIG. 5 shows an exemplary arrangement of program components for a server-based implementation of the Program Neighborhood application. The components include a Service (PNSVC) component 44', an Application Database component 48', an Application Program Interface (PNAPI) component 52', a User Interface component 56' and a local cache 60'. Each software component 44', 48', 52', 56', and 60' is installed on the application server 30'. The software components for the server-based implementation correspond to the software components for the client-based implementation of FIG. 4. The functionality of each server-based software component is similar to the client-based counterpart, with differences or added capabilities described below. The PNSVC 44' communicates with the application database 48' and with the PNAPI 52' using local procedure calls. The PNAPI 52' also communicates with the user interface module 56' and the local cache 60'.

Similar to that described in FIG. 4 for the client node 10, the client node 20 logs on to the network 40 (FIG. 1), the server 30' develops and maintains a database containing the application related information collected from the other servers 32, 34 in the server farm, and a communication link is established between the server 30' and the client node 20. The application server 30' is in communication with the client node 20 via an ICA channel connection 62'. The channel connection 62' can be established by an ICA virtual channel protocol (e.g., Thinwire). The Thinwire protocol can be used to transmit presentation commands from Windows-based applications running on the application server 30' to the client node 20. To a user of the client node 20, the applications appear to be running on the client node 20. The client node 20 can include a Remote Application Manager application program 64 that communicates with the application server 30' via the ICA channel connection 62'.

To run the Program Neighborhood application in a server-based implementation, the user of the client node 20 connects to an initial desktop (at the server 30') and launches the Program Neighborhood application from within that desktop environment. The connection to the initial desktop can occur automatically, e.g., via a logon script of the client node 20, via an entry in the StartUp group in Windows 95, or by another centrally managed server specific mechanism. All remote application management and launching is accomplished through this initial desktop.

Similar to that described in FIG. 4 for the server 30, the server 30' uses the user credentials to determine those application programs that are authorized for use by the user of the client node 20. A Program Neighborhood graphical window is returned to the client node 20 and displayed on the client screen 22 (FIG. 1). This window can contain icons representing the available and, possibly, the unavailable application programs that are in the program neighborhood of the client node 20.

The user of the client node 20 can select and launch one of the application programs displayed in the Program Neighborhood window. When launching an application, the Program Neighborhood application can execute the application on the same server 30', where applicable, taking into account load balancing requirements among servers and the availability of the application on that server 30'. The PNAPI 52' can include a launch mechanism for launching a remote application locally on the server 30' when the server 30' is nominated to launch the application. When a different server is needed to run the application, the Program Neighborhood application can launch the application via the server 30' (i.e., server-based client) using the windows to present the application on the desktop of the client node 20 as described above in FIG. 3B.

Figure 6A:
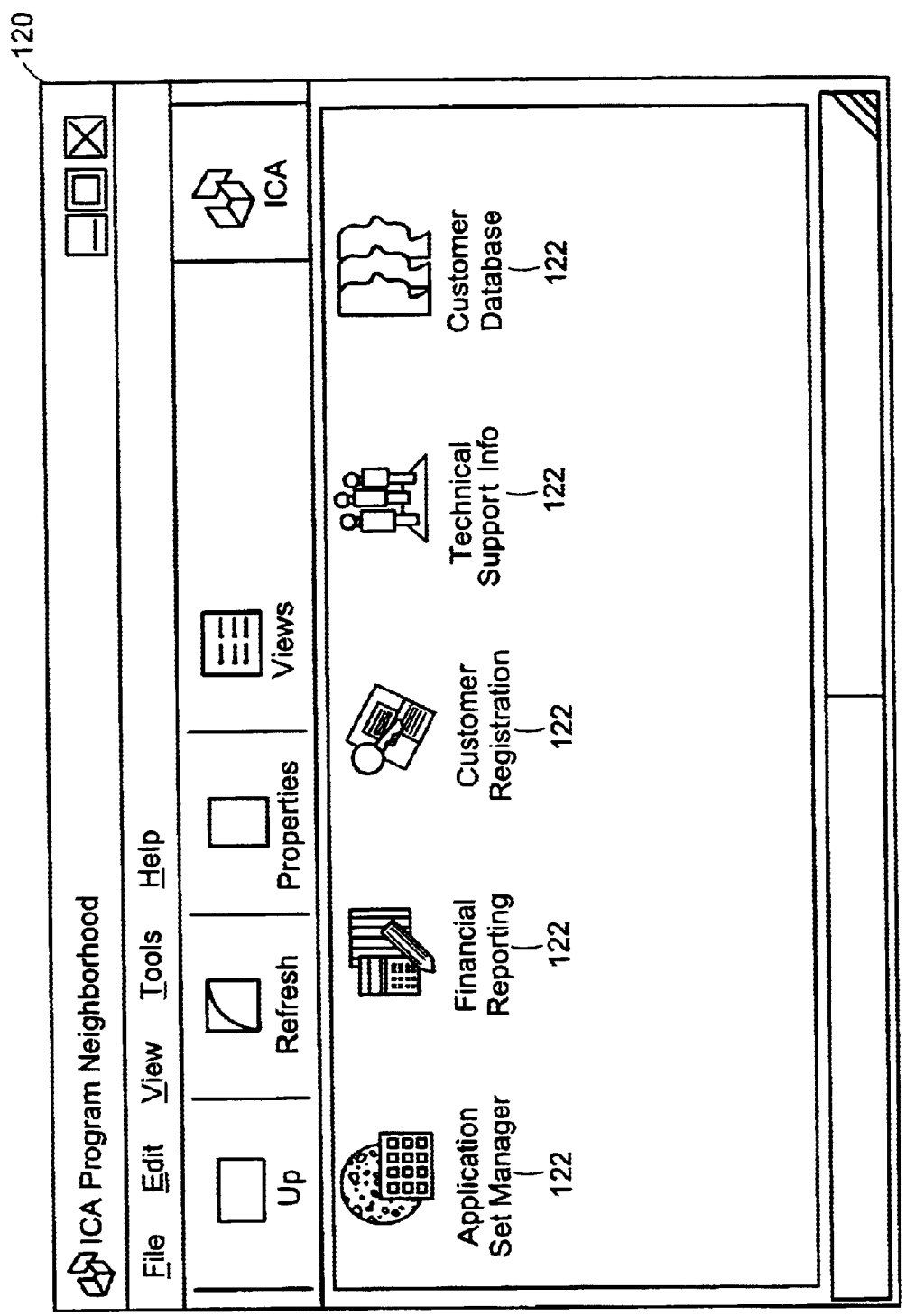
FIG. 6A is a screen shot of an exemplary display on the display screen of a client node after the program neighborhood application program of the invention is executed.

FIG. 6A is a screenshot of an exemplary Program Neighborhood window 120 that can be displayed on the screen 12, 22 (FIG. 1) of either client node 10, 20 after the Program Neighborhood application has executed. The window 120 includes graphical icons 122. Each icon 122 represents an application program that is hosted by one of the servers 30, 32, 34 and 36 on the network 40 (FIG. 1). Each represented application is available to the user of the client node for execution. The user can select and launch one of the applications using the mouse 18, 28 or keyboard 14, 24.

Figure 6B:
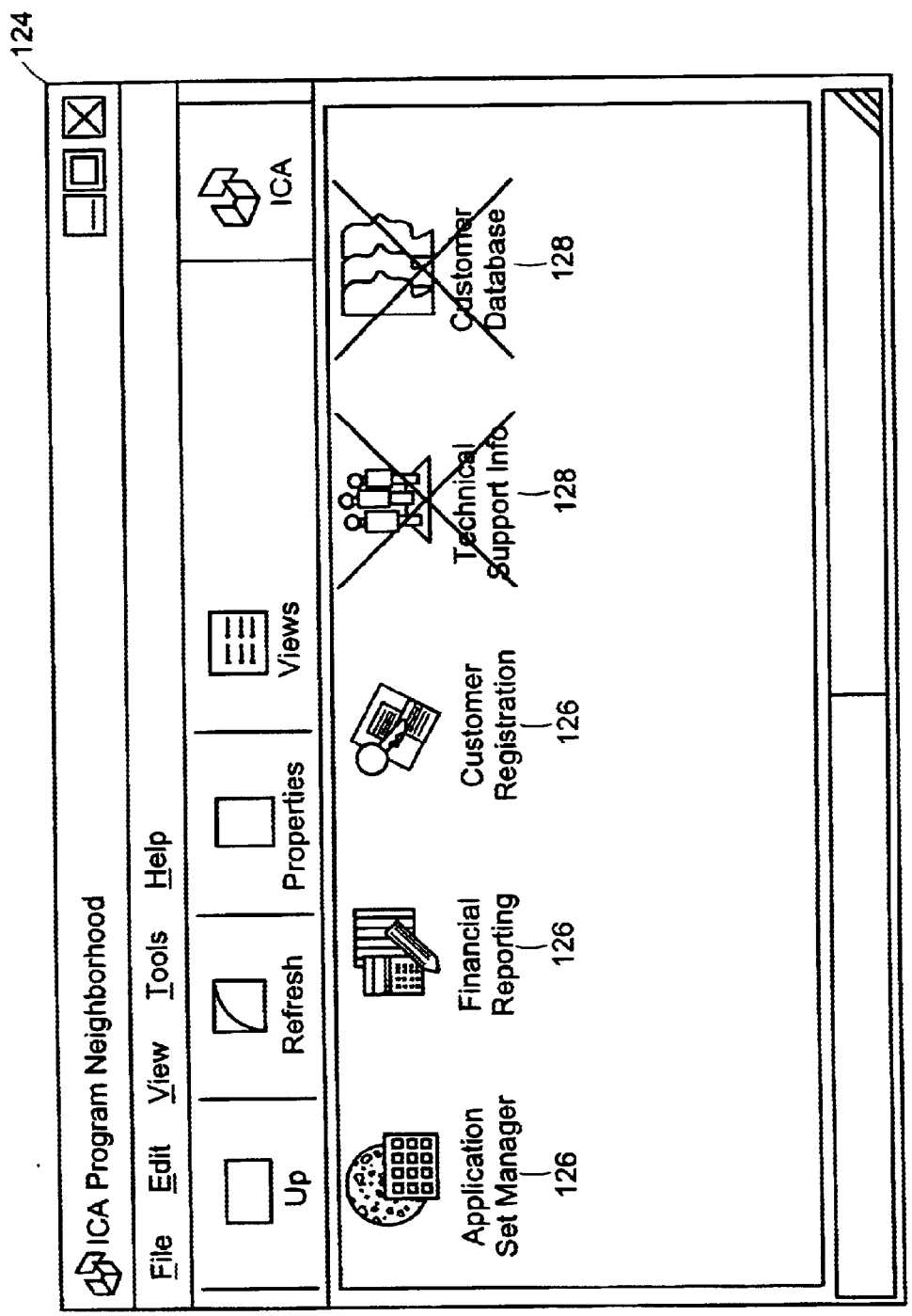
FIG. 6B is a screen shot of another exemplary display on the display screen of a client node after the program neighborhood application program of the invention is executed.

FIG. 6B is a screenshot of another exemplary Program Neighborhood window 124 that can be displayed on the screen 12, 22 (FIG. 1) of either client node 10, 20 after the Program Neighborhood application has executed. The window 124 includes graphical icons 126, 128. Each icon 126, 128 represents an application program that is hosted by one of the servers 30, 32, 34 and 36 on the network 40 (FIG. 1). Each application program represented by one of the icons 126 is available to the user of the client node 10, 20 for execution. The user can select and launch one of the applications using the mouse 18, 28 or keyboard 14, 24.

Each application program represented by one of the icons 128 is unavailable to the user of the client node 10, 20 (FIG. 1), although such applications are present in the server farm. The unavailability of these application programs can be noted on the display screen (e.g., "X"s can be drawn through the icons 128). An attempt to launch such an application program can trigger a message indicating that the user is not authorized to use the application.

FIG. 7 shows an exemplary process by which a user of either client node 10, 20 can be informed about the availability of applications hosted by application servers 30, 32, 34 and 36 on the network 40 (FIG. 1). In step 80, the client node 10, 20 requests log-on service from one of the servers, e.g., server 32. The server 32 requires valid user credentials to establish the connection. The server 32 receives the user credentials from the client node 10 (step 82), and authenticates the user for log-on (step 84). A desktop is displayed at the client node 10, 20 (step 85). The desktop can include a graphical icon representing the Program Neighborhood application program.

In step 86, the application server 32 establishes a connection with each other servers 30, 34 and 36 to exchange application-related information, as described above, corresponding to application programs hosted on those servers (step 88). In step 90, the application server 32 develops and maintains a database of the collected application-related information. Each other server 30, 34, 36 in the server farm can develop a database equivalent to the database of the server 32 and in similar manner as the server 32. In another embodiment, the database of the server 32 can be a centralized database that is accessible to each other application server 30, 34, 36 in the server farm. The collecting of application-related information can occur independently or be triggered by the request of the client node 10, 20 to log-on to the server farm 38.

In step 92, the client node 10, 20 can request execution of an application program from the desktop display. The master server node can process the request and, using a load-balancing evaluation and application availability as described above, determine the application server to provide the service to the client node 10, 20 (step 94). For example, the application server 32 can be selected to service the request with the client node 10, 20. In step 96, the client node 10, 20 establishes a communications link with the server 32. The server 32 and the client node 10, 20 can communicate according to the ICA protocol appropriate for that client node as described above.

Also in response to this request to run the application program, the master server node 30 or the server 32 can run the Program Neighborhood application (step 93) and push the results to the client node 10, 20, although the client node 10, 20 may not have requested the PN application program. When executing the PN application program, the master server node 30 or server 32 filters the application-related information in the database using the user credentials (step 100). The result of filtering the database determines those application programs that are authorized for use by the user of the client node 10, 20. The authorized application programs are in the program neighborhood of the client node 10, 20. This program neighborhood of available application information is pushed to the client node 10, 20 (step 102) and displayed on the client screen 12, 22 in a Program Neighborhood graphical window (step 104).

In other embodiments, the Program Neighborhood window may include applications that are in the server farm but unavailable for use to the client node 10, 20. In a Windows-based implementation, the available (and unavailable) application programs can be represented by icons. The user of the client node 10, 20 can select and launch one of the application programs displayed in the Program Neighborhood window.

While the invention has been shown and described with reference to specific preferred embodiments, it should be understood by those skilled in the art that various changes in form and detail may be made therein without departing from the spirit and scope of the invention as defined by the following claims.

What is claimed is:

1. In a network including a client system and a plurality of servers including a host server, the plurality of servers hosting application programs, a method for executing an application programs that is available for use, the method comprising:

executing, by the host server, a neighborhood application to collect application-related information from the plurality of servers concerning application programs hosted by the plurality of servers;

determining for each application program hosted by the plurality of servers whether that hosted application program is available to the client system based on the application-related information;

transmitting information from the host server to the client system indicating to the client system each hosted application program in the plurality of servers determined to be available to the client system for execution, receiving, from the client, a request to execute one of the available hosted application programs;

choosing, from the plurality of servers, a second server hosting the requested application program;

establishing, in response to the request, a first connection between the host server and the second server hosting the requested application;

executing the requested application program at the second server;

providing output from the executing application program to the host server; and providing the output from the host server to the client system.

2. The method of claim 1 further comprising establishing a connection between the client system and the host server using Independent Computing Architecture (ICA) protocol.

3. The method of claim 2 wherein the ICA protocol establishes a virtual channel to transmit the information to the client system indicating each hosted application program that is available to the client system.

4. The method of claim 1 further comprising:

receiving a second request to execute a second one of the available hosted application programs;

choosing, from the plurality of servers, a third server hosting the second requested application program;

establishing in response to the second request a second connection between the host server and the third server hosting the second requested application;

executing the second requested application at the third server;

providing output from the second executing application program to the host server; and providing the output from the second program from the host server to the client system.

5. The method of claim 4 further comprising merging the information received from the second and third servers for transmission to the client system.

6. The method of claim 1 wherein the transmitted information is displayeds at the client system as icons representing the available application programs in a graphical user interface window.

7. The method of claim 1 further comprising establishing a communications link between the host server and the client system, wherein the communications link includes at least one virtual channel.

8. The method of claim 1 further comprising:

receiving user credentials from the client system;

authenticating at the host server the user of the client system based on the received user credentials; and executing a selected one of the available application programs hosted by one of the plurality of servers other than the host server without requiring further input of user credentials by the user of the client system.

9. The method of claim 8 wherein the host server uses the user credentials to determine whether the user of the client system is authorized to access the host server and to determine those application programs that the user of the client system is authorized to execute.

10. The method of claim 1 wherein the host server transmits the available application information in response to a request for the available application information by the client system.

11. The method of claim 1 further comprising maintaining a database at the host server for storing the application-related information, wherein the database is accessible to each of the other servers of the plurality.

12. The method of claim 1 further comprising maintaining a database at each of the plurality of servers for storing the application-related information.

13. The method of claim 1 wherein the transmitted information further discloses to the user of the client system each hosted application program that the user of the client system is unauthorized to use.

14. The method of claim 1 further comprising transmitting by each server application-related information associated with each application program hosted by that server to a centralized database.

15. The method of claim 1 further comprising transmitting by each server application-related information associated with each application program hosted by that server to each of the other servers.

16. The method of claim 1 further comprising receiving user credentials from the client system for use in determining the availability of a hosted application program to the client system.

17. The method of claim 1 wherein the neighborhood application is executed in response to the receipt of a request to execute a hosted application program.

18. The method of claim 1 wherein the availability of the hosted application program is determined in part using the execution loads on the plurality of servers.

19. In a network including a client system and a plurality of servers hosting application programs, a server comprising:
    a service module collecting application-related information corresponding to application programs hosted by the plurality of servers;
    a database storing the collected application-related information wherein the service module determines for each application program hosted by the plurality of servers whether that hosted application program is available to the client system for execution based on the application-related information stored in the database;
    a transmitter transmitting information to the client system indicating to the client system each hosted application program in the plurality of servers determined to be available to the client system for execution;
    a receiver receiving a request to execute one of the available hosted application programs and choosing, from the plurality of servers, a second server hosting the requested application program; and
    a transceiver providing a connection between the client system and the second server for providing output from the execution of an application program.

20. The server of claim 19 wherein said service module transmits a datagram to other servers in the plurality to collect the application-related information corresponding to the application programs hosted by those servers.

21. The server of claim 19 wherein the database includes client information.

22. The server of claim 19 wherein said transmitter transmits available application information using a virtual channel communications protocol.

23. The server of claim 19 further comprising a second receiver receiving user credentials from the client system for use in determining the availability of a hosted application program to the client system.

24. In a network including a client node, a master server node, and plurality of application servers hosting application programs, a method for remotely executing an application program, the method comprising:
    transmitting information from a first application server to the client node indicating to the client node each hosted application program in the plurality of servers available to the client for execution;
    receiving from a client node, by the first application server, a request to execute an application program;
    transmitting the request to the master server node;
    indicating, by the master server node, the availability of the application program on a second application server selected from the plurality of appl. server to the first application server;
    executing the application program at the second application server;
    providing the output from the executing application program to the first application server; and
    providing, by the first application server, the output to the client node.

25. The method of claim 24 wherein the master server node determines the identity of the second application server based in part on the execution load on the second application server.

26. The method of claim 24 wherein the master server node determines the identity of the second application server based in part on the execution load on the second application server relative to the other application servers.

27. In a network including a client node, a master server node, and a plurality of application servers hosting application programs, a method for remotely executing an application program, the method comprising:
    transmitting information from a first application server to the client node indicating to the client node each hosted application program in the plurality of servers available to the client for execution;
    displaying, at the client node, a graphical display for requesting the execution of an application program;
    requesting from the first application server, by the client node, the execution of the application program;
    providing to the client node, by the first application server, application-related information concerning the execution of the application program;
    communicating with the master server node to determine, by the master server node, a second application server selected from the plurality for executing the application program;
    establishing a connection between the client node and the second application server;
    executing the application program at the second application server; and
    providing output associated with the execution of the requested application program from the second application server to the client node,
    wherein the determination of the second application server utilizes, in part, the provided application-related information.

28. The method of claim 27 wherein the application-related information includes information selected from the group consisting of the name of the application and the capabilities needed by the client node for the execution of the second application program.

29. In a network including a client system and a plurality of servers, the plurality of servers hosting application programs, a method for executing an application program that is available for use, the method comprising:

executing, by the client system, a neighborhood application to collect application-related information from the plurality of servers concerning application programs hosted by the plurality of servers;

determining for each application program hosted by the plurality of servers whether that hosted application program is available to the client system based on the application-related information;

receiving a request to execute one of the available hosted application programs;

choosing, from the plurality of servers, a first server hosting the requested application program;

establishing in response to the request a connection between the client system and the first server;

executing the requested application program at the first server; and providing output from the execution of the requested application program to the client system.

* * * * *

UNITED STATES PATENT AND TRADEMARK OFFICE
CERTIFICATE OF CORRECTION

PATENT NO. : 6,643,690 B2  
DATED : November 4, 2003  
INVENTOR(S) : Duursma et al.

It is certified that error appears in the above-identified patent and that said Letters Patent is hereby corrected as shown below:

Column 15,
Line 62, the phrase "application programs that is available" should read
-- application program that is available --.

Column 16,
Line 50, the word "displayeds" should read -- displayed --.

Signed and Sealed this

Ninth Day of March, 2004

JON W. DUDAS
*Acting Director of the United States Patent and Trademark Office*